Nov. 16, 1937.　　　　G. M. LANDES　　　　2,099,021
RODENT TRAP
Filed Feb. 24, 1936
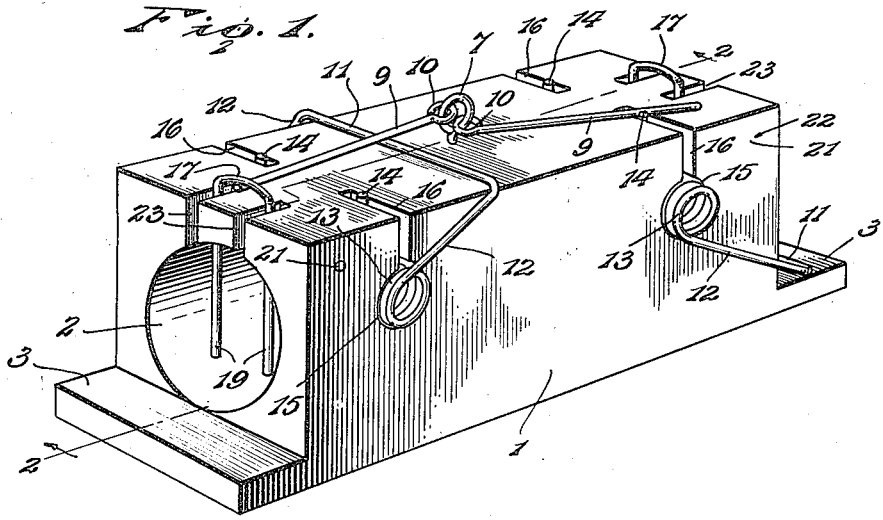
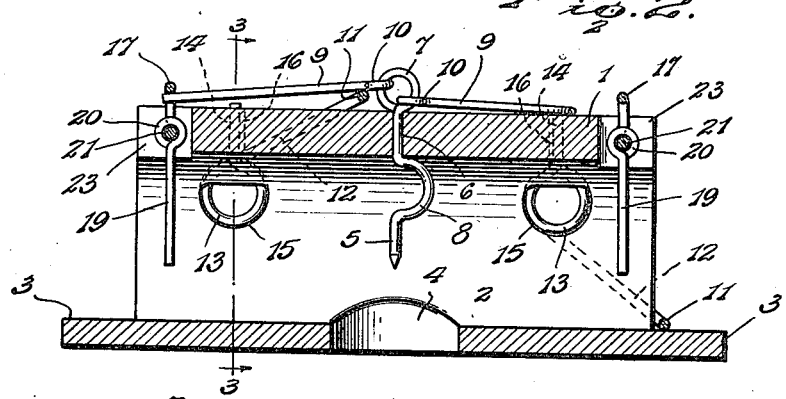
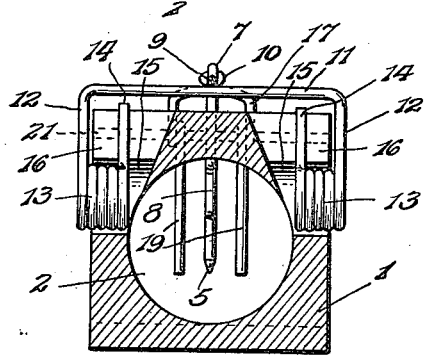
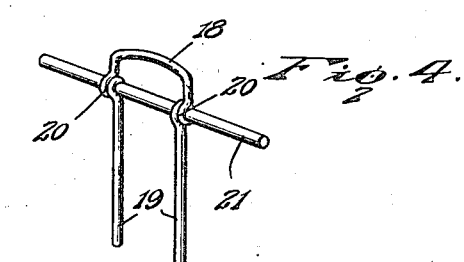
Inventor
George M. Landes.
By Lacey & Lacey, Attorneys Patented Nov. 16, 1937

2,099,021

UNITED STATES PATENT OFFICE 2,099,021

RODENT TRAP

George M. Landes, Webb City, Mo.

Application February 24, 1936, Serial No. 65,500

7 Claims. (Cl. 43—81)

This invention relates to traps and more particularly to a trap in which rats, mice and other rodents are to be caught, it being understood that the trap when constructed will be of the proper size according to the type of rodents to be caught.

One object of the invention is to provide a trap of such construction that the animal may enter from either end thereof and a single bait employed for enticing an animal to enter from either end.

Another object of the invention is to so construct the trap that a clear view may be obtained through the housing, midway the length of which the bait is suspended and thus cause each animal to be more anxious to be the first to reach the bait when it sees another about to enter from the other end of the trap.

Another object of the invention is to provide the trap with improved means for releasably holding spring actuated jaws in a raised or set position including jaw engaging rods carried by an eye formed at the upper end of the bait carrier and thus permitting the bait carrier to serve not only for holding bait but also as a carrier for the jaw engaging rods.

Another object of the invention is to so construct and mount the jaws that they may be easily applied to the housing or body portion of the trap and springs of the jaws tensioned when the jaws are moved to a raised or set position and, in addition, to so mount the jaws that while they will be ordinarily securely held in operative engagement with the housing, they may be easily removed in case replacement is necessary or their springs require adjustment due to becoming weak after the trap has been in use for some time.

Another object of the invention is to provide the trap with improved triggers for engaging the jaw holding rods and to permit these triggers to be mounted in such position that they will guard the entrances of the trap and cause the jaws to be released before an animal can reach and consume the bait.

Another object of the invention is to provide the trap with an opening through which bait may be applied to the bait holder, this opening being so located that when the trap is in use the opening will be closed by the surface upon which the trap rests and an animal thus prevented from having access to the bait through the opening.

The invention is illustrated in the accompanying drawing, wherein—

Figure 1 is a perspective view of the improved trap.

Figure 2 is a sectional view taken longitudinally through the trap along the line 2—2 of Figure 1.

Figure 3 is a sectional view taken transversely through the trap along the line 3—3 of Figure 2.

Figure 4 is a perspective view of one of the triggers.

The body portion or housing 1 of this improved trap may be formed of wood, metal, or any other desired material and may be rectangular in cross section or of any other cross sectional outline desired. A passage 2 extends longitudinally through the housing from one end to the other, as shown in Figure 2, and the bottom of the housing is flat, as shown in Figure 3, in order that the trap may rest flat upon the ground or any other surface upon which it is set when in use. At its ends the lower portion of the body is extended, as shown in Figures 1 and 2 to form platforms 3 across which the animal passes in order to enter the trap, these platforms also providing surfaces against which the jaws strike when released, as shown at the left of Figures 1 and 2, and thus cause an animal to be killed. An opening 4 is formed through the bottom of the body or housing under the bait holder 5 in order that bait may be easily passed upwardly through this opening and applied to the bait holder. As the opening is formed through the bottom of the trap it will be closed and concealed when the trap is set in place upon the ground and an animal will be prevented from having access to the interior of the trap except through ends of the passage 2.

The bait holder 5 is formed from a strand of strong wire which is passed through an opening 6 bored through the top of the housing midway the length thereof and the portion of the wire strand projecting upwardly from the opening 6 is bent to form an eye 7, while within the passage the wire strand is bent to form an offset portion 8 which bears against the underface of the top of the housing, as shown in Figure 2, and, together with the eye, prevents the bait holder from moving out of its proper position. Rods or jaw holders 9 which extend longitudinally of the housing over the same have eyes 10 loosely engaged with the eye 7 and, therefore, the bait holder serves not only as means for carrying the bait but also as means for carrying the jaw holding rods and serves a double purpose.

The jaws 11, by means of which the animal is to be caught, are formed of resilient wire and each has the strand from which it is formed bent to provide a U-shaped jaw having side arms 12, portions of which are coiled to form helical springs 13 terminating in radially extending anchoring members or arms 14 at their inner ends. The jaws straddle the body with the springs 13 seated in sockets 15 formed transversely of the body from opposite side faces thereof with their inner ends opening into the passage 2, as shown in Figure 3, and the arms or anchoring elements 14 engage in slots 16 extending upwardly from the sockets 15 and opening through the side faces and upper face of the housing. It will thus be seen that by springing the arms 12 apart, the springs and anchoring elements may be engaged in the sockets 15 and slots 16 and the arms then released and permitted to move toward each other and return to the normal parallel position shown in Figure 3 in which the springs will be seated in the sockets and the arms or anchoring elements engaged in the slots 16. The springs will be tensioned somewhat when these springs and anchoring arms are thrust into place within the sockets and slots 16 and when a jaw is swung upwardly to a set position over the housing, as shown in Figures 1 and 2, tension of the springs will be increased and when the jaws are released they will quickly move to the lowered position shown at the left of Figures 1 and 2 to strike a hard blow and either instantly kill an animal or firmly hold the animal against the cooperating platform 3 and prevent the animal from escaping. If it is found that the springs have become weakened after the trap has been in use for some time, one or both jaws may be removed by spreading the arms 12 and pressure applied to the anchoring elements to tighten the convolutions of the springs. The jaw or jaws will then be replaced and the trap will again be in serviceable condition.

In order to engage and hold the free ends of the jaw holding rods 9 when the trap is set, there have been provided triggers 17. Each of these triggers is formed as shown in Figure 4 and consists of a strand of strong wire bent to provide a bridge 18 having arms 19 extending downwardly therefrom. These arms are coiled in spaced relation to their upper ends to provide eyes 20 through which a pivot pin or rod 21 extends, the rod corresponding in length to the width of the housing and being passed through openings 22 bored transversely of the housing from opposite side faces thereof. The housing has its upper portion cut from its ends to form slots 23 intermediate its width and these slots are so spaced from each other than when the triggers are set in place and secured by the pins 21, the arms of the triggers will extend vertically through the slots with the bridges of the triggers disposed above the body or housing and spaced from the upper face thereof to such an extent that the ends of the jaw holding rods may be engaged under the bridges. Therefore, when a jaw is swung upwardly to a set position, the cooperating jaw holding rod may be disposed over the bridge of the jaw, as shown at the left of Figures 1 and 2, and when the free end of this rod is engaged under the bridge of the companion trigger, the jaw will be securely held in a set position. When an animal attempts to enter the trap, its head or some other portion of its body will engage the depending arms 19 and swing the trigger about the pivot pin 21, thus causing the bridge of the trigger to move out of a position in which it engages over the free end of the jaw holding rod. The rod will thus be released and resiliency of the springs 13 will cause the jaw to be swung forwardly and downwardly to the position shown at the right of Figures 1 and 2 and thus the bridge of the jaw will strike the animal a violent blow and either instantly kill it or firmly hold the animal. The animal cannot consume the bait as the trigger will be moved to release the jaw before the animal enters the passage 2 a sufficient distance to reach the bait and as the animal cannot enter the trap through the opening 4, the bait will not be consumed. As the passage 2 is open at both ends, two animals may enter the trap at the same time and when each animal sees the other, it will be more likely to enter the trap due to its endeavor to reach the bait before the other animal.

Having thus described the invention, what is claimed as new is:

1. A trap comprising a housing having a longitudinally extending passage opening through its ends and an opening in its bottom intermediate the length of the passage, a bait holder in said passage over the lower opening having a mounting portion extending upwardly through the top of the housing and being formed with an eye, jaw retainers carried by said eye, jaws carried by said housing and movable from a lowered position about the ends of the housing to a raised position over the top of the housing, the jaws being yieldably held against upward movement, and triggers carried by said housing adjacent the ends of the passages with portions disposed over the housing for engaging the free end portions of the jaw retaining elements and other portions extending downwardly into the passage and adapted to be engaged by animals entering the passage and moving the triggers to release the jaw retainers.

2. In a trap, a housing having a chamber extending longitudinally through the same and an opening in its bottom intermediate the length of the chamber, a bait holder carried by said housing over the lower opening and having a mounting portion extending through the top of the housing and formed with an eye at its upper end, a portion of the bait holder within the chamber being offset transversely for preventing upward movement of the bait holder and together with the eye firmly hold the bait holder in place, spring jaws carried by said housing and movable from a lowered position about the ends of the housing to a raised position over the housing, jaw retainers carried by said eye for extending toward the ends of the housing over the jaws and retaining the jaws raised, and triggers carried by said housing and each having a portion for engaging a companion jaw holding element and an actuating portion extending into the chamber adjacent an open end thereof.

3. In a trap, a housing having a chamber extending through the same from one end to the other, a platform at each end of the housing, a bait holder intermediate the length of the chamber, spring jaws carried by the housing and each movable from a lowered position in front of an adjacent end of the housing to a raised position over the housing, triggers carried by said housing and each having an actuating portion extending into the chamber, and jaw holders each free at one end and having its other end loosely connected with said bait holder, each jaw holder being of a length adapting it to extend over a jaw in a raised position and have its free end engaged by the companion trigger.

4. In a trap, a housing having a chamber extending through the same and open at its ends, a bait holder intermediate the length of said chamber, sockets in the side portions of the housing opening through the side faces thereof, jaws each U-shaped to provide a bridge and arms extending therefrom, the arms terminating in coiled springs seated in the opposed sockets of the housing and having tensioning members extending into slots leading from the sockets whereby the springs will be tensioned when a jaw is swung upwardly from a lowered position about an end portion of the body to a raised position over the body, jaw holders mounted intermediate the length of the body and extending longitudinally thereof for engaging over the raised jaws and holding the jaws in a set position, and triggers carried by the body adjacent ends thereof and each having a portion for engaging a companion jaw holder and an actuating portion extending into the chamber adjacent an open end thereof.

5. In a trap, a housing formed with a chamber having an entrance, sockets being formed in opposite side portions of the housing having seats leading therefrom, a U-shaped jaw formed from resilient material having its arms coiled to form spring members terminating in tensioning fingers, said jaw straddling the housing with the springs extending into the sockets and the tensioning fingers engaged in said seats, a bait holder secured through the upper wall of the housing, a jaw holder pivotally mounted at one end to the bait holder and extending longitudinally of the housing over the same for engaging over the jaw transversely thereof and holding the jaw in a raised position, and a trigger pivotally mounted through the upper wall of said housing and having an upper portion adapted to engage the jaw holder and a lower actuating portion extending into the chamber adjacent the open end thereof.

6. In a trap, a housing formed with a chamber having an entrance, opposed sockets being formed in the side portions of the housing and having seats leading therefrom, a U-shaped jaw of resilient material straddling the housing, coil springs carried by the arms of the jaw and mounted in said sockets, said springs having tensioning members engaged in said seats to tension the springs when the jaw is swung upwardly from a lowered position about an end of the housing to a raised position over the housing, slots formed longitudinally in said housing in spaced relation to each other transversely of the housing, a U-shaped trigger disposed vertically with its arms extending through the spaced slots into the chamber adjacent the entrance thereof, the arms of the trigger being formed with eyes disposed within the slots, a pivot pin extending transversely of the housing and engaged through the eyes of the trigger to pivotally mount the trigger, and a jaw holder carried by said housing and extending longitudinally thereof to engage over the jaw when the jaw is swung upwardly to a set position, said trigger having its upper portion adapted to engage the free end of the jaw holder and hold the jaw holder in position to retain the jaw in a raised position.

7. In a trap, a housing having a chamber therein formed with an entrance at one end, a bait holder secured through the top of the housing with its lower portion extending into the chamber and its upper portion projecting from the housing and formed with an eye, a trigger pivotally mounted through the top of the housing and having an actuating portion extending into the chamber adjacent the entrance, a spring jaw carried by said housing and movable from a lower position in front of the said end of the housing to a raised position over the housing, and a jaw holder having one end loosely connected with the eye of said bait holder, said jaw holder being of a length adapting it to extend over the jaw when raised and have its free end engaged with the trigger to releasably hold the jaw raised.

GEORGE M. LANDES.